Aug. 14, 1951  L. G. KRUG  2,564,070
SEAL
Filed Sept. 27, 1946
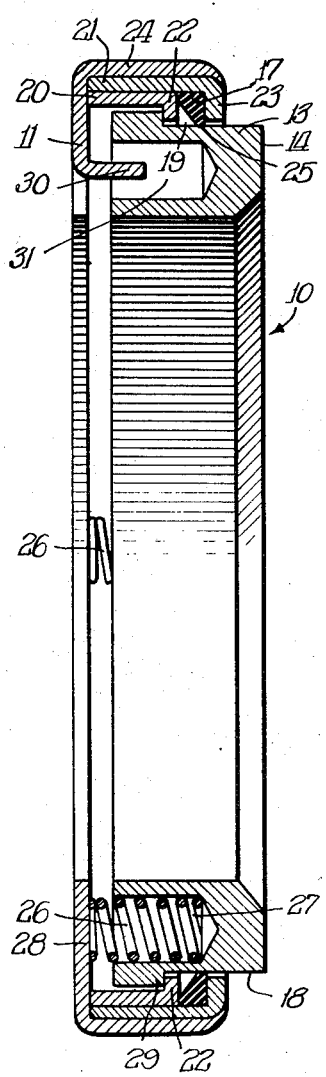
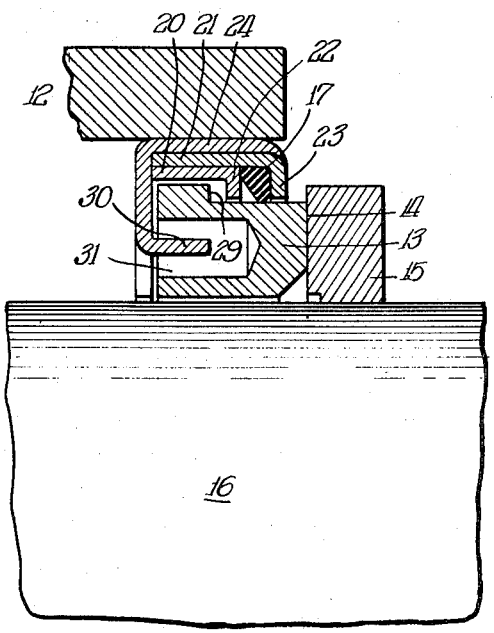
INVENTOR.
Louis G. Krug,
BY
Cromwell, Greist & Warden.

Patented Aug. 14, 1951

2,564,070

UNITED STATES PATENT OFFICE 2,564,070

SEAL

Louis G. Krug, Evanston, Ill., assignor to Chicago Rawhide Manufacturing Company, Chicago, Ill., a corporation of Illinois Application September 27, 1946, Serial No. 699,786

6 Claims. (Cl. 288—3)

This invention pertains to improvements in a dirt seal adapted for sealing engagement between a pair of relatively rotatable parts to prevent entry or passage of dirt or foreign matter therebetween, as well as leakage of liquid or fluid.

It is an object of my invention to provide a seal of very simple, compact and self-contained character for the foregoing purposes, which may be readily associated for operation with the pair of relatively rotatable parts and requires no attention following assembly.

Another object is to provide a seal of the foregoing character, including a flexible or elastic sealing band having operative frictional engagement with another part of the seal, and novel means defining a receiving and restraining groove for said band in the seal.

Yet another object is to provide a seal of the type described including a novel arrangement of parts for the dual purpose of affording a band receiving groove and limiting relative axial movement of a further component of the seal.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the claims.

In the drawings,

Fig. 1 is an enlarged view in longitudinal central section through one embodiment of the present seal; and Fig. 2 is an enlarged fragmentary view, in section similar to Fig. 1 of the seal of that figure in its operative, installed position relative to a pair of rotatable parts.

This invention provides a simple, inexpensive, yet highly effective dirt seal for association with a pair of relatively rotatable parts to prevent the entry or passage of dirt or liquid therebetween. More specifically, the invention pertains to certain improvements whereby a flexible and elastic sealing band constituting a part of the seal is assembled in operative relation to a coacting, relatively shiftable part of the seal, and to means whereby axial movement of said last named part is limited.

Referring to Fig. 1, the seal 10 disclosed therein comprises an outer annular casing or mounting member 11, adapted, to be fixedly associated with a part such as the housing 12, as by a force fit, in Fig. 2, or other mode of connection. A rigid annular sealing member 13 of carbon, metal or other sealing material or composition is concentrically housed within the member 11 for axial floating movement relative thereto. This sealing member has face sealing engagement at its annular end surface 14 with a coacting surface on a member 15 which is secured to a relatively rotatable part, as the shaft 16.

An annular flexible and elastic sealing element or band 17 is incorporated in the seal in concentric, constrictive and frictional sealing engagement with the outer peripheral surface 18 of the sealing member 13, whereby axial passage of liquid or foreign matter at this point is effectively prevented. Band 17 is carried in the housing 11 in a peripheral groove 19 opening radially inwardly toward the sealing surface 18 referred to above. Groove 19 is defined by a pair of inner and outer, angled rings 20, 21, respectively, having the respective inturned, annular flanges 22, 23. Rings 20, 21 are assembled in fixed telescoped, and preferably force fitted, relation, the inner ring 20 within the outer, and in this relation are disposed in the member 11 immediately within the annular axially extending wall portion 24 of the latter, with the flanges 22, 23 axially outward. The margin of wall portion 24 is spun over against the outer edge of ring 21 to hold said ring in fixed assembled relation to the housing.

Sealing band 17 is preferably of generally triangular cross-sectional outline, the inner peripheral surface thereof being inclined radially toward the sealing lip 25 in the manner illustrated, whereby an effective sealing engagement with surface 18 under sufficiently high unit pressure is made possible. It will be understood that the flanges 22, 23 or rings 20, 21 respectively serve to restrict sealing band 17 from axial movement, so that a pre-determined annular engagement with the surface 18 is possible, regardless of the axial position of the sealing member 13, which floats axially relative to the mounting member 11 in the operation of the seal.

Sealing member 13 is urged axially by means of a plurality of coil compression rings 26 disposed in recesses 27 of the sealing member and rearwardly abutting the radial wall 28 of the mounting member 11. In order to limit axial movement of the sealing member in the relaxed condition of the seal, under the force of the springs referred to, said member is conformed with a radially projecting shoulder 29. Shoulder 29 is engageable with the flange 22 of ring 20, in the manner illustrated in Fig. 1 to restrain the member 13 endwise, but in operative installed condition of the seal, shoulder 29 will be moved rearwardly from this flange, as illustrated in Fig. 2.

Relative rotation of the sealing member 13 with respect to the mounting member 11 is prevented by means of a lug or ear 30 struck out of radial wall 28 of the latter, which lug is engageable in a recess 31 of the sealing member.

In operation, the sealing band 17 has frictional, sealing engagement with the sealing surface 18 on member 13 as the latter floats in mounting member 11, the sealing member having relatively rotative sealing engagement with the part 15 in a well known manner. Regardless of the aforesaid axial floating movement of the sealing member 13 in operation, an efficient seal at surface 18 is insured by the sealing band, which is restrained from displacement from its optimum sealing position by the inturned flanges 22, 23.

The invention affords a simple but very efficient seal, characterized by a novel positioning groove for the sealing or packing band 17, in which assembly of the parts is greatly facilitated. Prior to installation of the seal in operating position, the sealing member 13 is restrained by the groove defining flange 22; hence, the seal is entirely self-contained. In operation, entry of dirt or leakage of liquid at the sealing surface 14 is effectively prevented through a long life of service.

What I claim is:

1. In a seal, means defining an annular housing, an annular sealing member concentrically mounted in said housing for axial floating movement therein, a flexible sealing band in said housing in concentric frictional sealing relation to said sealing member, means for axially restraining said band, including a flanged ring fixedly mounted in the housing, the flange of said ring coacting with said first named means in defining a groove receiving said band, said sealing member having stop means engageable with said flange to limit axial movement of the sealing member relative to the ring and housing, and a spring urging said sealing member in a direction to engage said stop means with said flange.

2. In a seal, an annular housing including a member having a radially extending flange, an annular sealing member concentrically mounted in said housing for axial floating movement therein, a flexible sealing band in said housing in concentric frictional sealing relation to said sealing member, means for axially restraining said band, including a flanged ring fixedly mounted in the housing, the flange of said ring coacting with said first named flange in defining a groove receiving said band, said sealing member having stop means engageable with one of said flanges to limit axial movement of the sealing member relative to the ring and housing, and a spring urging said sealing member in a direction to engage said stop means with said flange.

3. In a seal, means defining an annular housing, an annular sealing member concentrically mounted in said housing for axial floating movement therein, a resilient sealing band disposed in said housing in concentric sealing relation to said sealing member, said band being radially and axially tapered from a portion of greater thickness to a portion of lesser thickness which has frictional sealing engagement with said sealing member, means for axially restraining said band, including a member fixedly mounted in the housing and coacting therewith in defining a groove receiving said band, said sealing member being engageable with said fixedly mounted member to limit axial movement of the sealing member relative to the housing, means preventing relative rotation of the sealing member and housing, and a spring urging said sealing member in a direction to engage said stop means with said fixedly mounted member.

4. In a seal of the type described, an annular mounting member, a sealing member disposed concentrically within said mounting member and axially movable relative thereto, spring means disposed between and coacting with the mounting and sealing members to resist said movement, an annular sealing band concentrically disposed between said members in sealing relation thereto, and a pair of flanged rings fixedly mounted within said mounting member, the flanges of said rings being spaced axially to define a groove receiving said band, said sealing member being engageable with one of said flanges to limit axial movement of the sealing member in one direction, said spring means urging said sealing member in a direction to engage said flange.

5. In a seal of the type described, an annular mounting member, a sealing member disposed concentrically within said mounting member and axially movable relative thereto, spring means disposed between and coacting with the mounting and sealing members to resist said movement, an annular sealing band concentrically disposed between said members in sealing relation thereto and a pair of flanged rings fixedly mounted within said mounting member, the flanges thereof being spaced axially to define a groove receiving said band, said sealing member being engageable with one of said flanges to limit axial movement of the sealing member in one direction, and means restraining relative rotation of the sealing and mounting members, said spring means urging said sealing member in a direction to engage said flange.

6. In a seal of the type described, an annular mounting member, a sealing member concentric with said mounting member and axially movable relative thereto, an annular flexible sealing band concentrically disposed between said members in sealing relation thereto, a pair of radially flanged rings fixedly mounted on said mounting member, the flanges thereof extending in the same radial direction and being spaced to define a groove receiving and axially restraining said band, said sealing member having stop means engageable with one of said rings to limit axial movement of the sealing member in one direction, and a spring urging said sealing member in a direction to engage said stop means with said last named ring.

LOUIS G. KRUG.

REFERENCES CITED

The following references are of record in the file of this patent:

UNITED STATES PATENTS

| Number | Name | Date |
| --- | --- | --- |
| 1,807,569 | Clark | May 26, 1931 |
| 2,049,366 | Gardner | July 28, 1936 |
| 2,289,274 | Krug | July 7, 1942 |
| 2,311,494 | Vedovell | Feb. 16, 1943 |
| 2,363,110 | Krug | Nov. 21, 1944 |
| 2,398,376 | Hillman | Apr. 16, 1946 |

FOREIGN PATENTS

| Number | Country | Date |
| --- | --- | --- |
| 503,149 | Great Britain | of 1939 |